(12) United States Patent
Ikeda

(10) Patent No.: US 7,589,909 B2
(45) Date of Patent: Sep. 15, 2009

(54) REAR-FOCUSING TYPE ZOOM LENS AND IMAGING APPARATUS

(75) Inventor: Shinkichi Ikeda, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/246,185

(22) Filed: Oct. 6, 2008

(65) Prior Publication Data
US 2009/0091840 A1  Apr. 9, 2009

(30) Foreign Application Priority Data
Oct. 9, 2007  (JP) .......................... P2007-263199

(51) Int. Cl.
  G02B 15/14  (2006.01)
  G02B 3/02  (2006.01)
  G02B 9/36  (2006.01)
  G02B 9/60  (2006.01)
(52) U.S. Cl. ................ 359/688; 359/684; 359/715; 359/775; 359/776; 359/765
(58) Field of Classification Search ........... 359/686, 359/688, 683, 684, 708, 715, 771, 772, 775, 359/776, 763, 764, 765
See application file for complete search history.

(56) References Cited

U.S. PATENT DOCUMENTS 6,038,082 A * 3/2000 Takatsuki .............. 359/688

FOREIGN PATENT DOCUMENTS

| JP | 9-33812 A | 2/1997 |
| JP | 11-101941 A | 4/1999 |
| JP | 11-287952 A | 10/1999 |
| JP | 2005-345970 A | 12/2005 |
| JP | 2007-128110 A | 5/2007 |
| JP | 2007-171248 A | 7/2007 |
| WO | WO-2005/008311 A1 | 1/2005 |

* cited by examiner

Primary Examiner—William C Choi
Assistant Examiner—Jack Dinh
(74) Attorney, Agent, or Firm—Birch, Stewart, Kolasch & Birch, LLP

(57) ABSTRACT

A rear-focusing type zoom lens includes, in order from an object side, a positive first group being fixed, a negative second group moving toward an image plane along an optical axis during zooming from a wide-angle end to a telephoto end; a negative third group being fixed in an optical axis direction, and a positive fourth group moving along the optical axis direction to correct image plane variation being caused by zooming. The first group includes a first subgroup having a negative power as a whole and a second subgroup having a positive power as a whole. The first subgroup includes a negative meniscus lens having a convex surface directed toward the object side and a negative lens. The second subgroup includes a positive lens group having at least one positive lens, a negative lens, a positive lens, and another positive lens group having at least one positive lens.

20 Claims, 13 Drawing Sheets

EXAMPLE 1

EXAMPLE 1

EXAMPLE 2

EXAMPLE 3

FIG. 4

| | EXAMPLE 1 BASIC LENS DATA | | | | |
|---|---|---|---|---|---|
| | Si (SURFACE NUMBER) | Ri (CURVATURE RADIUS) | Di (SURFACE SEPARATION) | ndj (REFRACTIVE INDEX) | vdj (ABBE NUMBER) |
| | OBJECT PLANE | ∞ | ∞ | | |
| G1A | 1 | 96.700 | 2.40 | 1.83481 | 42.7 |
| G1A | 2 | 33.770 | 11.56 | | |
| G1A | 3 | -846.623 | 2.00 | 1.88300 | 40.8 |
| G1A | 4 | 69.053 | 15.55 | | |
| G1B | 5 | 430.570 | 4.45 | 1.72825 | 28.5 |
| G1B | 6 | -158.078 | 0.20 | | |
| G1B | 7 | 71.945 | 9.76 | 1.53172 | 48.8 |
| G1B | 8 | -78.024 | 2.15 | | |
| G1B | 9 | 74.506 | 2.00 | 1.84661 | 23.9 |
| G1B | 10 | 30.693 | 8.55 | 1.49700 | 81.5 |
| G1B | 11 | 572.799 | 0.20 | | |
| G1B | 12 | 51.120 | 5.37 | 1.77250 | 49.6 |
| G1B | 13 | -415.521 | D13 (VARIABLE) | | |
| G2 | 14 | 38.290 | 0.95 | 1.88300 | 40.8 |
| G2 | 15 | 11.163 | 4.40 | | |
| G2 | 16 | -25.472 | 0.84 | 1.83481 | 42.7 |
| G2 | 17 | 94.611 | 0.22 | | |
| G2 | 18 | 23.134 | 6.21 | 1.75520 | 27.5 |
| G2 | 19 | -10.774 | 1.44 | 1.88300 | 40.8 |
| G2 | 20 | -530.934 | D20 (VARIABLE) | | |
| | 21 (APERTURE DIAPHRAGM) | ∞ | 3.30 | | |
| G3 | 22 | -15.316 | 0.80 | 1.80400 | 46.6 |
| G3 | 23 | 17.377 | 4.64 | 1.84661 | 23.9 |
| G3 | 24 | -23.429 | 1.00 | | |
| G3 | 25 | 46.117 | 5.38 | 1.49700 | 81.5 |
| G3 | 26 | -13.865 | 0.90 | 1.83400 | 37.2 |
| G3 | 27 | -21.288 | 1.33 | | |
| G3 | 28 | -26.354 | 3.40 | 1.75520 | 27.5 |
| G3 | 29 | -81.974 | D29 (VARIABLE) | | |
| G4 | 30 | -49.996 | 0.80 | 1.84661 | 23.9 |
| G4 | 31 | 32.207 | 4.39 | 1.69350 | 53.2 |
| G4 | 32 | -29.887 | 0.10 | | |
| G4 | *33 | 28.231 | 5.15 | 1.58809 | 60.4 |
| G4 | *34 | -41.089 | D34 (VARIABLE) | | |
| G5 | 35 | 2481.774 | 2.50 | 1.62299 | 58.2 |
| G5 | 36 | -192.814 | 5.25 | | |
| GP | 37 | ∞ | 21.00 | 1.70154 | 41.2 |
| GP | 38 | ∞ | 6.75 | 1.51633 | 64.1 |
| GP | 39 | ∞ | 5.00 | | |
| | IMAGE PLANE | ∞ | | | |

(*: ASPHERICAL SURFACE)

| | EXAMPLE 1 ASPHERIC SURFACE DATA | | | | |
|---|---|---|---|---|---|
| SURFACE NUMBER | K | A4 | A6 | A8 | A10 |
| 33RD SURFACE | 1.0000000 | -6.6692757E-06 | -3.3129075E-08 | 1.1409502E-10 | -8.7917844E-14 |
| 34TH SURFACE | 1.0000000 | 7.7509553E-06 | -3.1428658E-08 | 7.6508365E-11 | 1.1987696E-16 |

(B)

| | EXAMPLE 1 VARIOUS DATA (ZOOM RATIO = 7.8) | | |
|---|---|---|---|
| | WIDE ANGLE END | INTERMEDIATE | TELEPHOTO END |
| FOCAL LENGTH: f | 3.37 | 13.48 | 26.29 |
| F NUMBER | 1.64 | 2.15 | 2.40 |
| HALF ANGLE OF VIEW: ω | 44.06 | 12.57 | 6.57 |
| IMAGE HEIGHT | 3.10 | 3.10 | 3.10 |
| LENS OVERALL LENGTH | 187.00 | 187.00 | 187.00 |
| BACK FOCAL LENGTH: Bf | 27.01 | 27.01 | 27.01 |
| D13 | 1.00 | 24.46 | 30.81 |
| D20 | 35.50 | 12.04 | 4.69 |
| D29 | 10.04 | 7.27 | 9.78 |
| D34 | 1.50 | 4.27 | 1.76 |

(C)

| EXAMPLE 1 FOCAL LENGTHS OF RESPECTIVE GROUPS | | |
|---|---|---|
| GROUP | START SURFACE | FOCAL LENGTH |
| 1 | 1 | 30.47 |
| 2 | 14 | -12.53 |
| 3 | 21 | -23521.72 |
| 4 | 30 | 25.55 |
| 5 | 35 | 286.12 |

FIG. 6

| | EXAMPLE 2 BASIC LENS DATA | | | | |
|---|---|---|---|---|---|
| | Si (SURFACE NUMBER) | Ri (CURVATURE RADIUS) | Di (SURFACE SEPARATION) | ndj (REFRACTIVE INDEX) | vdj (ABBE NUMBER) |
| | OBJECT PLANE | ∞ | ∞ | | |
| G1A | 1 | 110.097 | 2.40 | 1.88300 | 40.8 |
| G1A | 2 | 32.962 | 11.95 | | |
| G1A | 3 | 1283.627 | 2.00 | 1.83481 | 42.7 |
| G1A | 4 | 61.010 | 11.41 | | |
| G1B | 5 | 70.589 | 11.51 | 1.60342 | 38.0 |
| G1B | 6 | -63.314 | 6.95 | | |
| G1B | 7 | 71.002 | 2.00 | 1.84661 | 23.9 |
| G1B | 8 | 30.503 | 9.39 | 1.49700 | 81.5 |
| G1B | 9 | -773.456 | 0.20 | | |
| G1B | 10 | 53.186 | 6.42 | 1.77250 | 49.6 |
| G1B | 11 | -173.233 | D11 (VARIABLE) | | |
| G2 | 12 | 56.498 | 0.95 | 1.88300 | 40.8 |
| G2 | 13 | 11.878 | 4.35 | | |
| G2 | 14 | -35.365 | 0.80 | 1.83481 | 42.7 |
| G2 | 15 | 79.210 | 0.16 | | |
| G2 | 16 | 23.065 | 5.88 | 1.75520 | 27.5 |
| G2 | 17 | -11.885 | 0.90 | 1.88300 | 40.8 |
| G2 | 18 | 1795.360 | D18 (VARIABLE) | | |
| | 19 (APERTURE DIAPHRAGM) | ∞ | 3.30 | | |
| G3 | 20 | -14.200 | 0.83 | 1.80400 | 46.6 |
| G3 | 21 | 18.767 | 4.61 | 1.84661 | 23.9 |
| G3 | 22 | -18.614 | 1.00 | | |
| G3 | 23 | 46.117 | 5.38 | 1.49700 | 81.5 |
| G3 | 24 | -13.865 | 0.90 | 1.83400 | 37.2 |
| G3 | 25 | -21.288 | 1.33 | | |
| G3 | 26 | -23.615 | 3.40 | 1.80518 | 25.4 |
| G3 | 27 | -148.728 | D27 (VARIABLE) | | |
| G4 | 28 | -41.567 | 0.86 | 1.80809 | 22.8 |
| G4 | 29 | 41.567 | 5.07 | 1.63854 | 55.4 |
| G4 | 30 | -23.855 | 0.10 | | |
| G4 | *31 | 25.153 | 5.15 | 1.58809 | 60.4 |
| G4 | *32 | -37.960 | D32 (VARIABLE) | | |
| G5 | 33 | -472.631 | 2.50 | 1.83481 | 42.7 |
| G5 | 34 | ∞ | 4.48 | | |
| GP | 35 | ∞ | 21.00 | 1.70154 | 41.2 |
| GP | 36 | ∞ | 6.75 | 1.51633 | 64.1 |
| GP | 37 | ∞ | 5.00 | | |
| | IMAGE PLANE | ∞ | | | |

(*: ASPHERICAL SURFACE)

| | EXAMPLE 2 ASPHERIC SURFACE DATA | | | | |
|---|---|---|---|---|---|
| SURFACE NUMBER | K | A4 | A6 | A8 | A10 |
| 31ST SURFACE | 1.2721988 | -1.2002393E-05 | -2.5138669E-08 | -4.8758879E-11 | 2.5753831E-13 |
| 32ND SURFACE | 0.7882985 | 7.2671646E-06 | -3.1728927E-08 | 7.6334552E-11 | 0 |

(B)

| EXAMPLE 2 VARIOUS DATA (ZOOM RATIO = 7.80) | | | |
|---|---|---|---|
| | WIDE ANGLE END | INTERMEDIATE | TELEPHOTO END |
| FOCAL LENGTH: f | 3.37 | 13.48 | 26.29 |
| F NUMBER | 1.64 | 2.15 | 2.40 |
| HALF ANGLE OF VIEW: ω | 44.03 | 12.65 | 6.61 |
| IMAGE HEIGHT | 3.10 | 3.10 | 3.10 |
| LENS OVERALL LENGTH | 187.50 | 187.50 | 187.50 |
| BACK FOCAL LENGTH: Bf | 27.01 | 27.01 | 27.01 |
| D11 | 1.00 | 25.75 | 33.32 |
| D18 | 37.01 | 12.27 | 4.69 |
| D27 | 9.29 | 7.33 | 9.28 |
| D32 | 1.50 | 3.47 | 1.51 |

(C)

| EXAMPLE 2 FOCAL LENGTHS OF RESPECTIVE GROUPS | | |
|---|---|---|
| GROUP | START SURFACE | FOCAL LENGTH |
| 1 | 1 | 30.99 |
| 2 | 12 | -13.26 |
| 3 | 19 | -334.65 |
| 4 | 28 | 21.77 |
| 5 | 33 | -563.02 |

FIG. 8

| | | EXAMPLE 3 BASIC LENS DATA | | | |
|---|---|---|---|---|---|
| | | Si (SURFACE NUMBER) | Ri (CURVATURE RADIUS) | Di (SURFACE SEPARATION) | ndj (REFRACTIVE INDEX) | vdj (ABBE NUMBER) |
| | | OBJECT PLANE | ∞ | ∞ | | |
| G1 | G1A | 1 | 135.415 | 2.50 | 1.83481 | 42.7 |
| | | 2 | 40.629 | 12.24 | | |
| | | 3 | -538.373 | 2.50 | 1.88300 | 40.8 |
| | | 4 | 93.869 | 10.11 | | |
| | G1B | 5 | 92.447 | 9.10 | 1.67270 | 32.1 |
| | | 6 | -102.024 | 0.20 | | |
| | | 7 | 254.084 | 2.00 | 1.84661 | 23.9 |
| | | 8 | 51.987 | 8.43 | 1.49700 | 81.5 |
| | | 9 | 1247.815 | 0.20 | | |
| | | 10 | 100.783 | 9.47 | 1.49700 | 81.5 |
| | | 11 | -75.422 | 0.20 | | |
| | | 12 | 44.209 | 6.65 | 1.69680 | 55.5 |
| | | 13 | 145.875 | D13 (VARIABLE) | | |
| G2 | | 14 | 73.584 | 0.95 | 1.88300 | 40.8 |
| | | 15 | 13.725 | 4.08 | | |
| | | 16 | -42.989 | 0.80 | 1.88300 | 40.8 |
| | | 17 | 85.978 | 0.10 | | |
| | | 18 | 26.350 | 6.51 | 1.80518 | 25.4 |
| | | 19 | -10.867 | 0.90 | 1.88300 | 40.8 |
| | | 20 | 48.668 | D20 (VARIABLE) | | |
| | | 21 (APERTURE DIAPHRAGM) | ∞ | 3.30 | | |
| G3 | | 22 | -16.793 | 0.98 | 1.77250 | 49.6 |
| | | 23 | 16.793 | 4.46 | 1.80809 | 22.8 |
| | | 24 | -29.955 | 1.00 | | |
| | | 25 | 46.117 | 5.38 | 1.49700 | 81.5 |
| | | 26 | -13.865 | 0.90 | 1.83400 | 37.2 |
| | | 27 | -21.288 | 1.33 | | |
| | | 28 | -25.676 | 1.00 | 1.80518 | 25.4 |
| | | 29 | -50.162 | D29 (VARIABLE) | | |
| G4 | | 30 | -76.815 | 0.80 | 1.84661 | 23.9 |
| | | 31 | 30.951 | 4.76 | 1.64000 | 60.1 |
| | | 32 | -30.951 | 0.10 | | |
| | | *33 | 25.153 | 5.15 | 1.58809 | 60.4 |
| | | *34 | -37.960 | D34 (VARIABLE) | | |
| G5 | | 35 | -472.631 | 2.50 | 1.83481 | 42.7 |
| | | 36 | ∞ | 4.48 | | |
| GP | | 37 | ∞ | 21.00 | 1.70154 | 41.2 |
| | | 38 | ∞ | 6.75 | 1.51633 | 64.1 |
| | | 39 | ∞ | 5.00 | | |
| | | IMAGE PLANE | ∞ | | | |

(*: ASPHERICAL SURFACE)

| | EXAMPLE 3 ASPHERIC SURFACE DATA | | | | |
|---|---|---|---|---|---|
| SURFACE NUMBER | K | A4 | A6 | A8 | A10 |
| 33RD SURFACE | 1.2721988 | -1.2002393E-05 | -2.5138669E-08 | -4.8758879E-11 | 2.5753831E-13 |
| 34TH SURFACE | 0.7882985 | 7.2671646E-06 | -3.1728927E-08 | 7.6334552E-11 | 0 |

(B)

| EXAMPLE 3 VARIOUS DATA (ZOOM RATIO = 7.80) | | | |
|---|---|---|---|
| | WIDE ANGLE END | INTERMEDIATE | TELEPHOTO END |
| FOCAL LENGTH: f | 3.40 | 13.60 | 26.52 |
| F NUMBER | 1.64 | 2.15 | 2.40 |
| HALF ANGLE OF VIEW: ω | 44.05 | 12.74 | 6.67 |
| IMAGE HEIGHT | 3.10 | 3.10 | 3.10 |
| LENS OVERALL LENGTH | 186.26 | 186.26 | 186.26 |
| BACK FOCAL LENGTH: Bf | 27.01 | 27.01 | 27.01 |
| D13 | 1.00 | 26.17 | 34.00 |
| D20 | 36.09 | 10.92 | 3.09 |
| D29 | 12.06 | 8.34 | 8.05 |
| D34 | 1.50 | 5.22 | 5.51 |

(C)

| EXAMPLE 3 FOCAL LENGTHS OF RESPECTIVE GROUPS | | |
|---|---|---|
| GROUP | START SURFACE | FOCAL LENGTH |
| 1 | 1 | 37.66 |
| 2 | 14 | -11.35 |
| 3 | 21 | -2952.67 |
| 4 | 30 | 22.88 |
| 5 | 35 | -563.02 |

FIG. 10

| VALUES RELATING TO CONDITIONAL EXPRESSIONS | | | | |
|---|---|---|---|---|
| CONDITIONAL EXPRESSION | NUMBER OF EXPRESSION | EXAMPLE 1 | EXAMPLE 2 | EXAMPLE 3 |
| $7 < |f11/fw| < 12$ | (1) | 9.15 | 8.54 | 10.71 |
| $0.6 < |f11/Bfw| < 2$ | (2) | 1.14 | 1.07 | 1.35 |
| $n11 > 1.8$ | (3) | 1.83481 | 1.88300 | 1.83481 |
| $\nu 11 > 30$ | (4) | 42.7 | 40.8 | 42.7 |
| $n12 > 1.8$ | (5) | 1.88300 | 1.83481 | 1.88300 |
| $\nu 12 > 30$ | (6) | 40.8 | 42.7 | 40.8 |
| $n14 > 1.8$ | (7) | 1.84661 | 1.84661 | 1.84661 |
| $n15 < 1.5$ | (8) | 1.49700 | 1.49700 | 1.49700 |
| $\nu 15 > 70$ | (9) | 81.5 | 81.5 | 81.5 |

EXAMPLE 1 (WIDE ANGLE END)

EXAMPLE 1 (TELEPHOTO END)

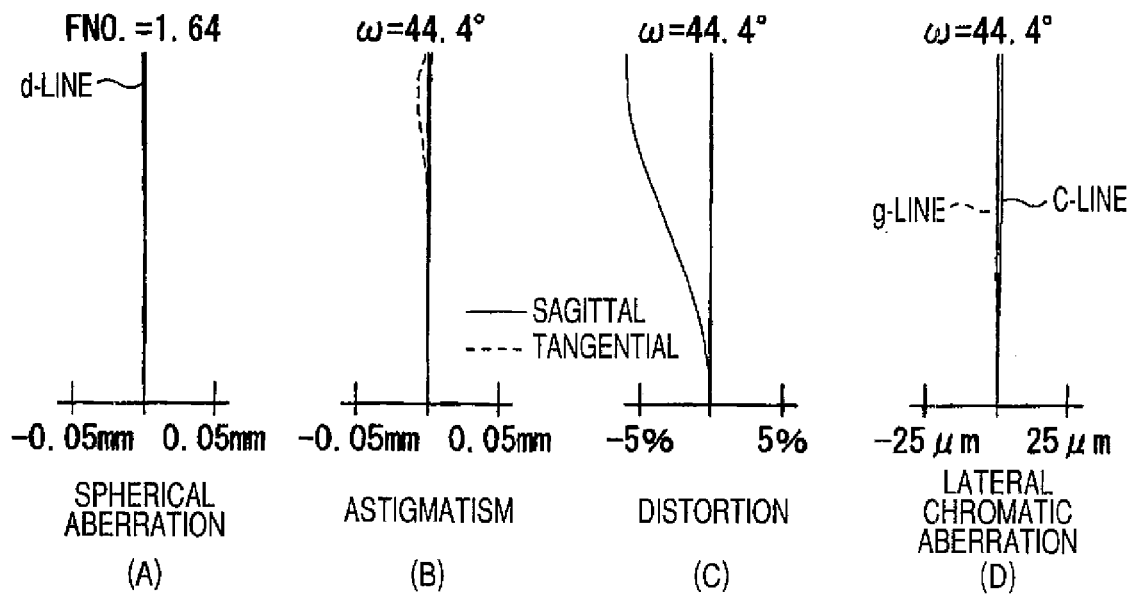
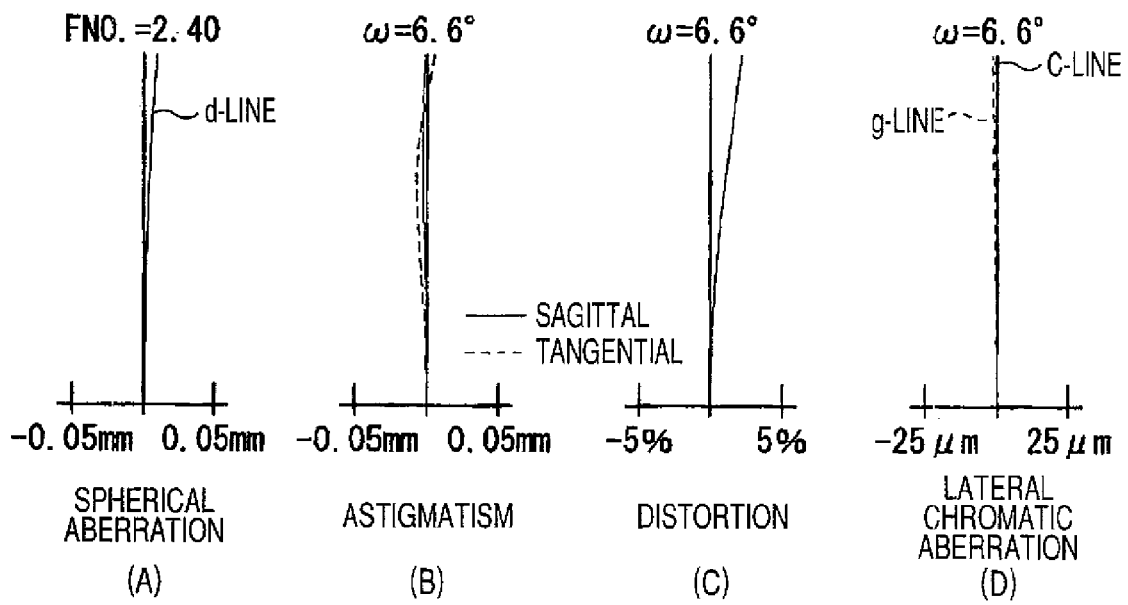

EXAMPLE 3 (WIDE ANGLE END)

EXAMPLE 3 (TELEPHOTO END)

REAR-FOCUSING TYPE ZOOM LENS AND IMAGING APPARATUS

CROSS-REFERENCE TO RELATED APPLICATIONS

This application is based upon and claims the benefit of priority from the Japanese Patent Application No. 2007-263199 filed on Oct. 9, 2007; the entire contents of which are incorporated herein by reference.

BACKGROUND OF THE INVENTION

1. Technical Field

The invention relates to a zoom lens for use in a video camera and a television camera compatible with HD, particularly, to a rear-focusing type zoom lens configured to perform focusing by moving a lens group being disposed on an image side of a first group and an imaging apparatus having the rear-focusing type zoom lens.

2. Description of the Related Art

In the field of a zoom lens, a rear-focusing type zoom lens that performs focusing by moving a lens group being disposed on the image side of a first group is known. As compared with a system in which the first lens group is moved to perform focusing, the rear-focusing type zoom lens can reduce an effective diameter of the first lens group. Furthermore, a rear-focusing type zoom lens performs focusing by moving a light-weight lens group, and thus it is possible to perform quick focusing. For example, JP Hei. 11-101941 A and JP Hei. 11-287952 A describe rear-focusing type zoom lenses that have, in order from the object side, a positive first group, a negative second group, a positive third group, and a negative fourth group. In the lenses, the second group and the fourth group are moved during zooming, and the fourth group is moved to perform focusing.

In general, when a lens system is mounted on a camera compatible with high image quality, a predetermined back focal length is required in order to arrange an optical member such as a color separation prism. Meanwhile, a zoom lens having a wide angle and a high zoom ratio is required. However, generally, when a lens is designed to have a short focal length, it is difficult to obtain a long back focal length while maintaining a high optical performance. In the related art, if it is intended to obtain a wide-angle lens having 85 degrees or more in angle of view while ensuring a sufficiently long back focal length, field of curvature at a telephoto end deteriorates. Thus, it is difficult to achieve high zoom ratio. For example, in any of the zoom lenses described in disclosed in JP Hei. 11-101941 A and JP Hei. 11-287952 A, a good balance between a high zoom ratio and widening of angle of view cannot be achieved. The following problems are accompanied by widening of the angle of view of the rear-focusing type zoom lens. That is, a back focal length is shortened, lateral chromatic aberration and distortion are deteriorated, it is difficult to achieve a high zoom ratio because aberration fluctuation caused by zooming increases, a diameter of the first group increases, and the like. Accordingly, it has been demanded to solve these problems and to develop a zoom lens that achieves a good balance between widening of an angle of view and a high zoom ratio.

SUMMARY OF THE INVENTION

The invention has been made in view of the above circumstances and provides a rear-focusing type zoom lens that in which aberrations are well corrected while a sufficiently long back focal length is ensured, and a good balance between widening of an angle of view and a high zoom ratio can be achieved, and an imaging apparatus that is mounted with the rear-focusing type zoom lens and can obtain a high quality image at a wide angle of view.

According to an aspect of the invention, a rear-focusing type zoom lens includes, in order from an object side, a positive first group, a negative second group, a negative third group and a positive fourth group. The positive first group is fixed. The negative second group moves toward an image plane along an optical axis during zooming from a wide-angle end to a telephoto end. The negative third group is fixed in an optical axis direction. The positive fourth group moves along the optical axis direction to correct image plane variation, which is caused by the zooming, and to perform focusing. The first group includes, in order from the object side, a first subgroup having a negative power as a whole and a second subgroup having a positive power as a whole. The first subgroup includes, in order from the object side, a negative meniscus lens having a convex surface directed to the object side and a negative lens. The second subgroup includes, in order from the object side, a first positive lens group including at least one positive lens, a negative lens, a positive lens, and a second positive lens group including at least one positive lens.

In the rear-focusing type zoom lens according to the aspect of the invention, the third group has the negative power, and the first group has a retrofocus type structure including the negative first subgroup and the positive second subgroup. Thereby, it is possible to achieve widening of angle of view while obtaining a sufficiently long back focal length. Also, by optimizing the lens configurations of the first and second subgroups of the first group, aberration is sufficiently corrected at the telephoto end at which a high magnification ratio can be achieved. Thereby, it is possible to satisfactorily correct the aberrations while ensuring a sufficiently long back focal length and to achieve a good balance between the widening of the angle of view and the high zoom ratio.

In addition, if any of the following preferable conditions is appropriately adopted and satisfied, it is further facilitated to achieve the widening of the angle of view and the high zoom ratio.

It is preferable that the first subgroup of the first group satisfies the following conditional expressions:

$$7 < |f11/fw| < 12 \tag{1}$$

$$0.6 < |f11/Bfw| < 2 \tag{2}$$

where f11 denotes a focal length of the first subgroup, fw denotes a focal length of the whole system at the wide-angle end, and Bfw denotes a back focal length at the wide-angle end, the back focal length being defined as an air-equivalent value of an optical axis distance from the last lens surface to the image plane.

Also, it is preferable that the negative meniscus lens of the first subgroup satisfies any of the following conditional expressions (3) and (4) and that the negative lens of the first subgroup satisfies the following conditional expressions (5) and (6);

$$n11 > 1.8 \tag{3}$$

$$v11 > 30 \tag{4}$$

$$n12 > 1.8 \tag{5}$$

$$v12 > 30 \tag{6}$$

where n11 denotes a refractive index of the negative meniscus lens of the first subgroup at the d-line, v11 denotes an Abbe number of the negative meniscus lens of the first subgroup at the d-line.

n12 denotes a refractive index of the negative lens of the first subgroup at the d-line, and v12 denotes an Abbe number of the negative lens of the first subgroup at the d-line.

It is further preferable that the negative meniscus lens of the first subgroup and the negative lens of the first subgroup satisfy all of the conditional expressions (3) to (6).

Also, it is preferable that the first positive lens group of the second subgroup includes at least one biconvex lens. Furthermore, it is preferable that the negative lens of the second subgroup and the positive lens of the second subgroup satisfy the following conditional expressions:

$$n14>1.8 \quad (7)$$

$$n15<1.5 \quad (8)$$

$$v15>70 \quad (9)$$

where n14 denotes a refractive index of the negative lens of the second subgroup at the d-line, n15 denotes a refractive index of the positive lens of the second subgroup at the d-line, and v15 denotes an Abbe number of the positive lens of the second subgroup at the d-line.

Also, it is preferable that the negative lens of the second subgroup and the positive lens of the second subgroup are cemented to each other. Cementing the negative lens of the second subgroup and the positive lens of the second subgroup is advantageous to correct the lateral chromatic aberration.

Also, it is preferable that the fourth group includes at least one aspherical lens.

Also, the rear-focusing type zoom lens may further include a positive or negative fifth group that is disposed on an image plane side of the fourth group.

Also, the third group may include, in order from the object side, a third subgroup, a fourth subgroup and a fifth subgroup. The fourth subgroup may be movable in a direction perpendicular to the optical axis, for image stabilization.

According to another aspect of the invention, an imaging apparatus includes the rear-focusing type zoom lens according to the aspect of the invention and an imaging device that outputs an imaging signal based on an optical image formed by the rear-focusing type zoom lens.

In the imaging apparatus according to the another aspect of the invention, a high-resolution imaging signal is obtained based on a wide-angle and high-resolution optical image formed by the rear-focusing type zoom lens according to the aspect of the invention. Based on this imaging signal, an image having a wide angle and high quality can be obtained.

According to the rear-focusing type zoom lens set forth above, in the configuration having at least four lens groups as a whole, the third group has the negative power, and the first group has a retrofocus type structure including the negative first subgroup and the positive second subgroup. Thereby, the configuration is advantageous to achieve the widening of the angle of view and to ensure a back focal length. Also, lens configurations of the first subgroup and second subgroup are optimized. As a result, it is possible to correct the aberrations well while ensuring a sufficiently long back focal length and to achieve a good balance between the widening of the angle of view and the high zoom ratio.

In addition, according to the imaging apparatus set forth above, an imaging signal is output based on an optical image formed by the rear-focusing type zoom lens according to the aspect of the invention. Therefore, it is possible to obtain an image having a wide angle and high quality.

BRIEF DESCRIPTION OF THE DRAWINGS

FIG. 4 is a diagram showing basic lens data of the rear-focusing type zoom lens according to Example 1.

FIG. 5 is a diagram showing other lens data of the rear-focusing type zoom lens according to Example 1, where FIG. 5(A) shows aspherical surface data, FIG. 5(B) shows various data about zooming, and FIG. 5(C) shows focal length data of respective groups.

FIG. 6 is a diagram showing basic lens data of the rear-focusing type zoom lens according to Example 2.

FIG. 7 is a diagram showing other lens data of the rear-focusing type zoom lens according to Example 2, where FIG. 7(A) shows aspherical surface data, FIG. 7(B) shows various data about zooming, and FIG. 7(C) shows focal length data of respective groups.

FIG. 8 is a diagram showing basic lens data of the rear-focusing type zoom lens according to Example 3.

FIG. 9 is a diagram showing other lens data of the rear-focusing type zoom lens according to Example 3, where FIG. 9(A) shows aspherical surface data, FIG. 9(B) shows various data about zooming, and FIG. 9(C) shows focal length data of respective groups.

FIG. 10 is a diagram collectively showing values of conditional expressions for the Examples.

FIG. 11(A) shows spherical aberration, FIG. 11(B) shows astigmatism, FIG. 11(C) shows distortion, and FIG. 11(D) shows lateral chromatic aberration.

FIG. 12(A) shows spherical aberration, FIG. 12(B) shows astigmatism, FIG. 12(C) shows distortion, and FIG. 12(D) shows lateral chromatic aberration.

FIG. 13 is an aberration diagram showing various aberrations of the rear-focusing type zoom lens according to Example 2 at a wide-angle end, where FIG. 13(A) shows spherical aberration, FIG. 13(B) shows astigmatism, FIG. 13(C) shows distortion, and FIG. 13(D) shows lateral chromatic aberration.

FIG. 14 is an aberration diagram showing various aberrations of the rear-focusing type zoom lens at according to Example 2 a telephoto end, where FIG. 14(A) shows spherical aberration, FIG. 14(B) shows astigmatism, FIG. 14(C) shows distortion, and FIG. 14(D) shows lateral chromatic aberration.

FIG. 15(A) shows spherical aberration, FIG. 15(B) shows astigmatism, FIG. 15(C) shows distortion, and FIG. 15(D) shows lateral chromatic aberration.

FIG. 16(A) shows spherical aberration, FIG. 16(B) shows astigmatism, FIG. 16(C) shows distortion, and FIG. 16(D) shows lateral chromatic aberration.

DETAILED DESCRIPTION OF EMBODIMENTS OF THE INVENTION

Hereinafter, embodiments of the invention will be described in detail with reference to the accompanying drawings.

Figure 1:
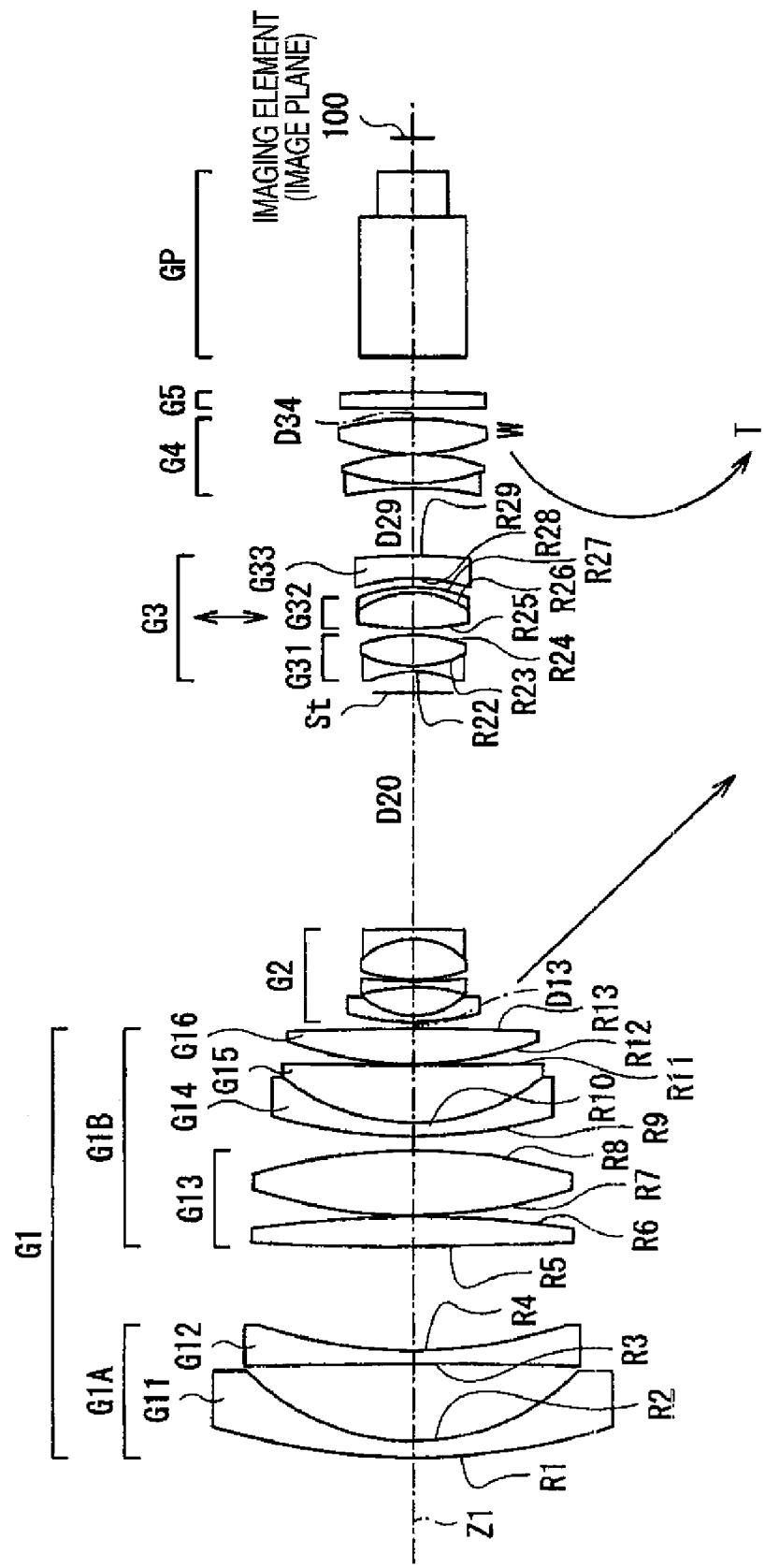
FIG. 1 is a sectional view of a first configuration example of a rear-focusing type zoom lens according to an embodiment of the invention, corresponding to Example 1.
Figure 2:
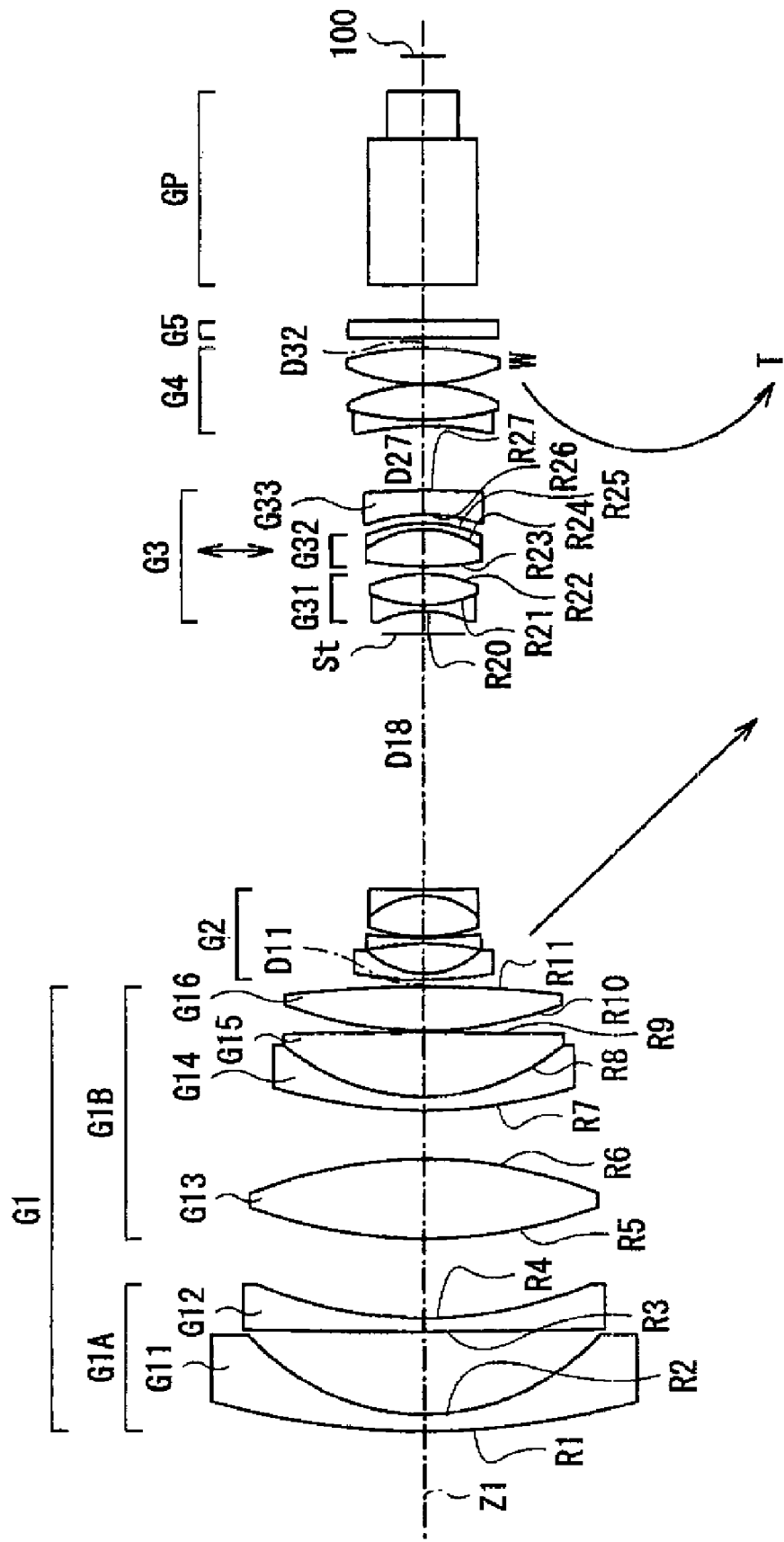
FIG. 2 is a sectional view of a second configuration example of a rear-focusing type zoom lens according to the embodiment of the invention, corresponding to Example 2.
Figure 3:
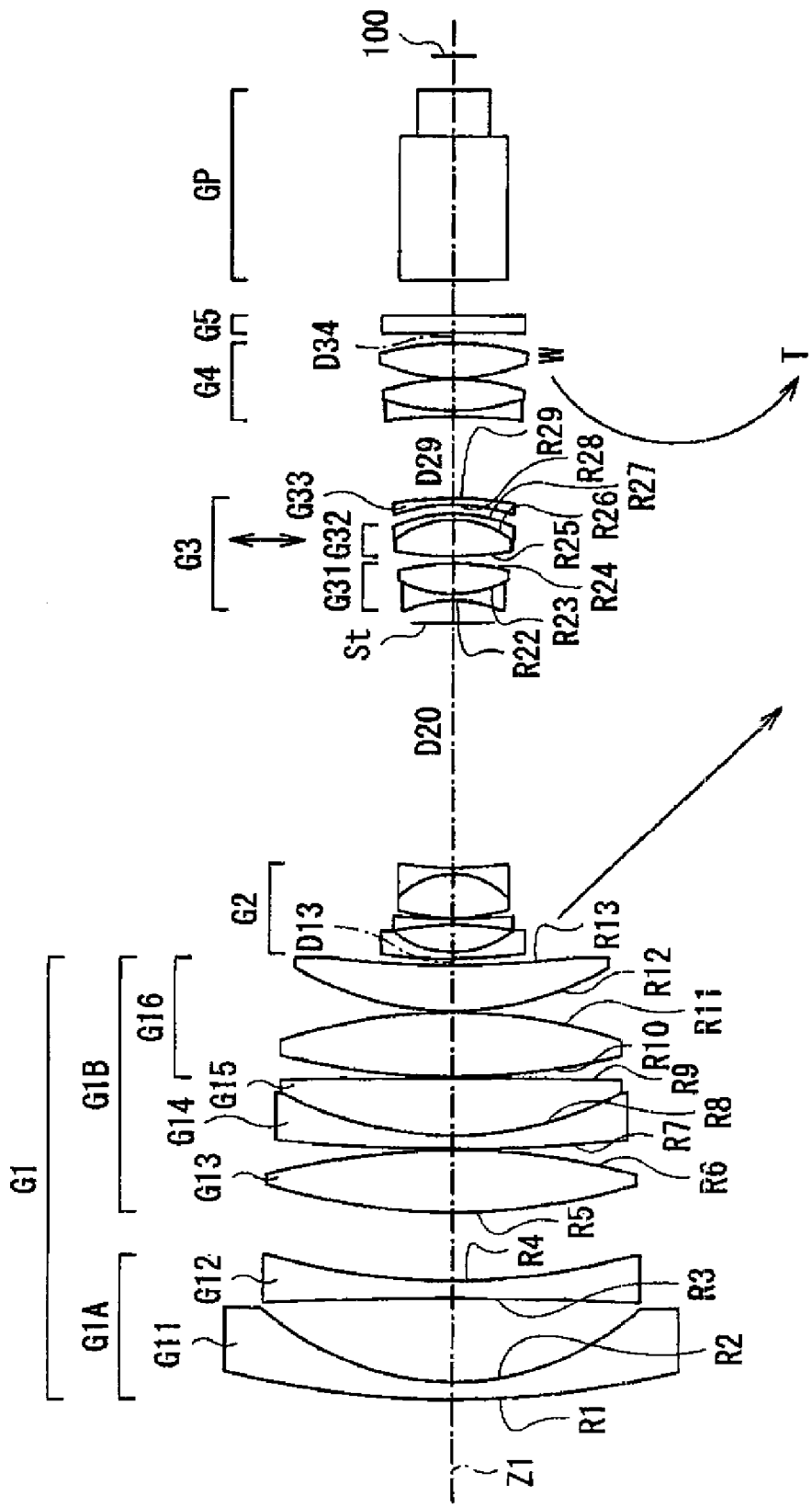
FIG. 3 is a sectional view of a third configuration example of a rear-focusing type zoom lens according to the embodiment of the invention, corresponding to Example 3.
Figure 11:
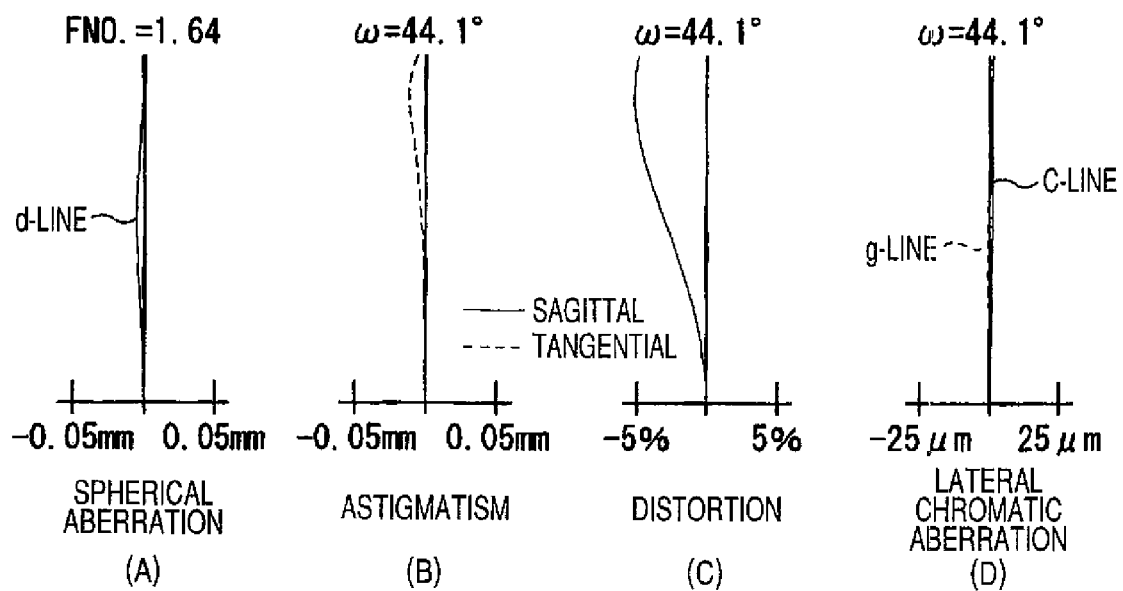
FIG. 11 is an aberration diagram showing various aberrations of the rear-focusing type zoom lens according to Example 1 at a wide-angle end, where
Figure 12:
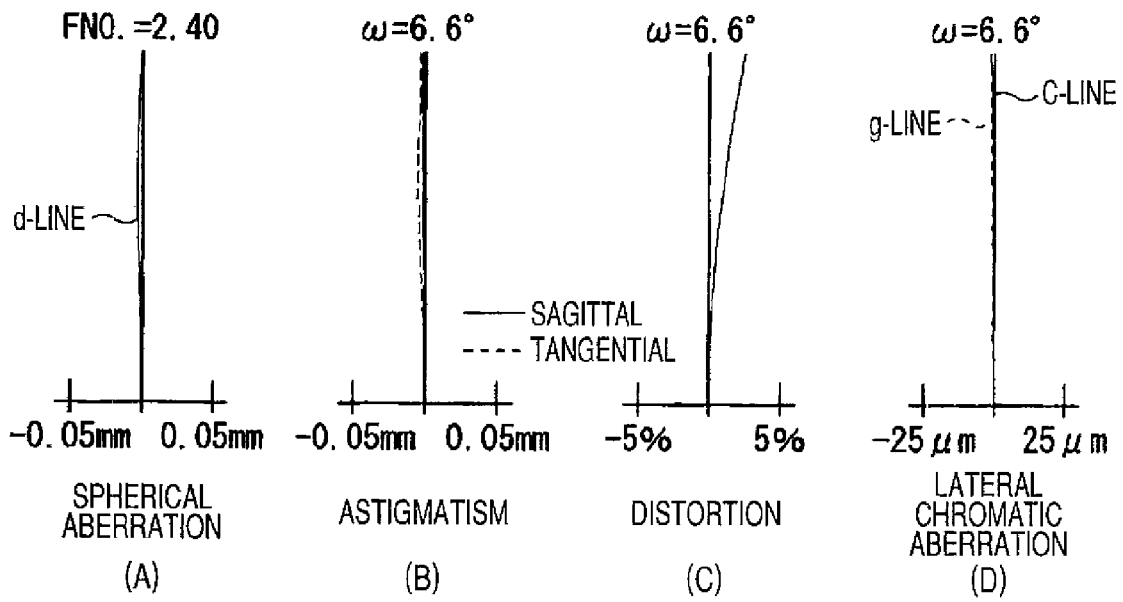
FIG. 12 is an aberration diagram showing various aberrations of the rear-focusing type zoom lens according to Example 1 at a telephoto end, where
Figure 15:
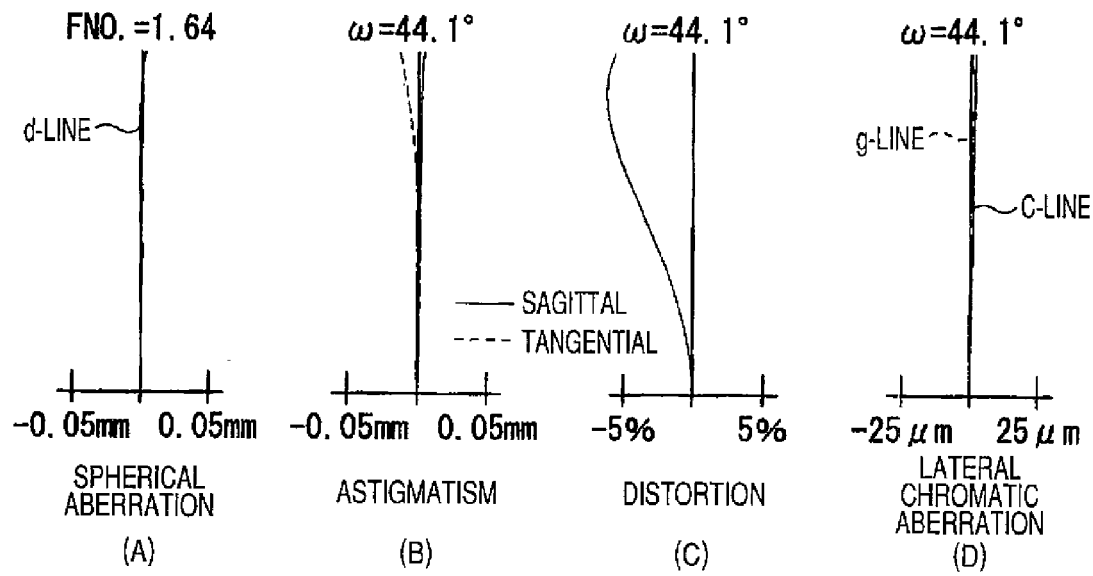
FIG. 15 is an aberration diagram showing various aberrations of the rear-focusing type zoom lens according to Example 3 at a wide-angle end, where
Figure 16:
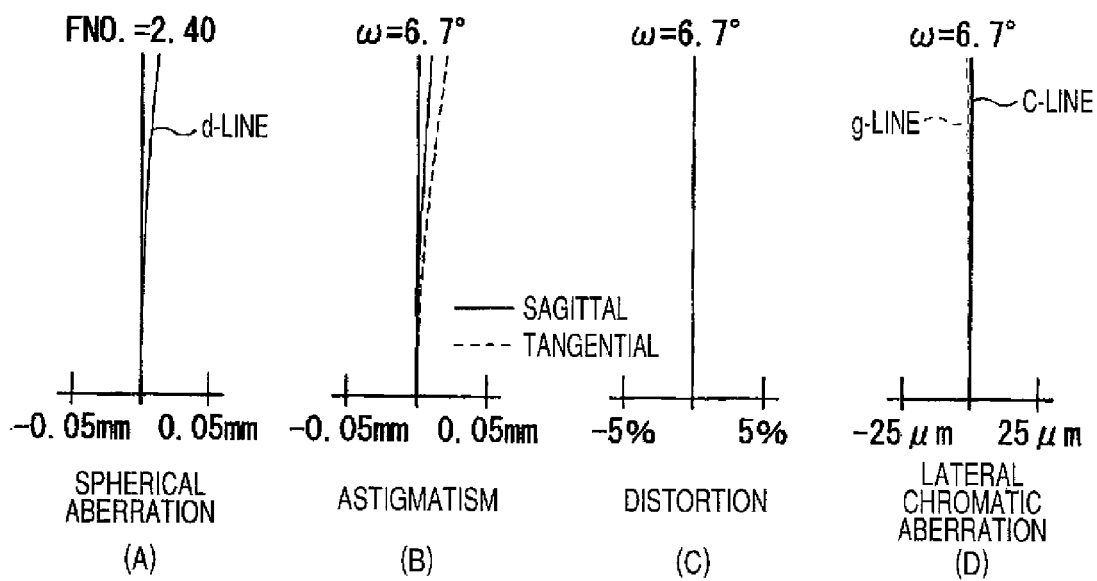
FIG. 16 is an aberration diagram showing various aberrations of the rear-focusing type zoom lens according to Example 3 at a telephoto end, where

FIG. 1 shows a first configuration example of a rear-focusing type zoom lens system according to an embodiment of the invention. This configuration example corresponds to a lens configuration of a first numerical example (shown in FIGS. 4 and 5(A) to 5(C)), which will be described later. FIG. 2 shows a second configuration example and corresponds to a lens configuration of a second numerical example (FIGS. 6 and 7(A) to 7(C)), which will be described later. FIG. 3 shows a third configuration example and corresponds to a lens configuration of a third numerical example (FIGS. 8 and 9(A) to (C)), which will be described later. Also, each of FIGS. 1 to 3 shows the lens arrangement in which the lens is in a wide-angle end state and focuses on an object at infinity. In FIGS. 1 to 3, a reference sign Ri represents a curvature radius of i-th surface, where a surface of a lens element on the most object side is regarded as a first surface and the number i is the sequential number that sequentially increases as it gets closer to the image side (the image formation side). The reference sign Di represents a surface separation, on an optical axis Z1, between i-th surface and (i+1)th surface. The reference sign Di is only shown on the surface separations that change in accordance with the zooming operation. The reference sign Ri is only shown on a first group G1 and a third group G3 that are characterized parts in this embodiment.

The rear-focusing type zoom lens according to this embodiment is formed into a zoom lens having a high zoom ratio (about 8 times) and a wide angle of view (an angle of view of about 88 degrees) so as to be appropriate to video cameras and television cameras compatible HD. This rear-focusing type zoom lens includes, in order from the object side along the optical axis Z1, a positive first group G1 that is fixed, a negative second group G2 that moves toward an image plane along the optical axis during zooming from a wide-angle end to a telephoto end, a negative third group G3 that is fixed in an optical axis direction, and a positive fourth group G4 that moves along the optical axis direction to correct image plane variation, which is caused by the zooming, and to perform focusing. An aperture diaphragm St is an optical aperture diaphragm and is disposed on the object side of the third group G3.

The rear-focusing type zoom lens further includes a positive or negative fifth group G5 that is disposed on the image plane side of the fourth group G4. In the first configuration example shown in FIG. 1, the fifth group G5 includes one positive lens. In the second and third configuration example shown in FIGS. 2 and 3, the fifth group G5 includes one negative lens. It is advantageous in correction of the chromatic aberration to provide the fifth group G5. Furthermore, the fifth group G5 also provides another advantage that dust is prevented from entering into a lens barrel.

On the image formation plane (an imaging surface) of the rear-focusing type zoom lens, an imaging element 100 such as a CCD (a Charge Coupled Device) or a CMOS (a Complementary Metal Oxide Semiconductor) is disposed. Also, between the last lens group (the fifth group G5) and the imaging surface, a color separating prism block GP is disposed. The imaging element 100 outputs an electric signal (an imaging signal) based on a subject image formed by the rear-focusing type zoom lens. An imaging apparatus includes at least the rear-focusing type zoom lens of this embodiment and the imaging element 100.

In the rear-focusing type zoom lens, the second group G2 and the fourth group G4 move along a locus shown in the figures during zooming. Specifically, the second group G2 moves toward the image plane along the optical axis Z1 during zooming from the wide-angle end (W) to the telephoto end (T), thereby widening the space between the first group G1 and the second group G2. As the zooming proceeds from the wide-angle end to the telephoto end, the fourth group G4 moves on the optical axis Z1 toward the object side, and then moves toward the image side. Thus, the fourth group G4 moves along a locus having an arc shape. The fourth group G4 also moves during focusing in each zoom range. In order to perform focusing at the time of close-range photography, the fourth group G4 moves to narrow the space between the third group G3 and the fourth group G4. The first group G1 is always fixed during zooming and focusing. Also, as described later, the third group G3 is configured so that a part of lenses thereof are movable for vibration control in a direction perpendicular to the optical axis Z1.

The first group G1 includes, in order from the object side, a first subgroup G1A having a negative power as a whole, and a second subgroup G1B having a positive power as a whole.

The first subgroup G1A includes, in order from the object side, one negative meniscus lens G11 having a convex surface directed toward the object side and one negative lens G12. It is preferable that the first subgroup G1A satisfies the following conditions.

$$7 < |f11/fw| < 12 \tag{1}$$

$$0.6 < |f11/Bfw| < 2 \tag{2}$$

Here, f11 denotes a focal length of the first subgroup G1A, fw denotes a focal length of the whole system at the wide-angle end, and Bfw denotes a back focal length at the wide-angle end (an optical axis distance from the last lens surface to the image plane (in air-equivalent value)).

It preferable that the negative meniscus lens G11 and the negative lens G12 satisfy the following conditions.

$$n11 > 1.8 \tag{3}$$

$$v11 > 30 \tag{4}$$

$$n12 > 1.8 \tag{5}$$

$$v12 > 30 \tag{6}$$

Here, n11 denotes a refractive index of the negative meniscus lens G11 at the d-line, v11 denotes an Abbe number of the negative meniscus lens G11 at the d-line, n12 denotes a refractive index of the negative lens G12 at the d-line, and v12 denotes an Abbe number of the negative lens G12 at the d-line.

The second subgroup G1B includes, in order from the object side, a positive lens group G13 including at least one positive lens, a negative lens G14, a positive lens G15, and a positive lens group G16 including at least one positive lens. In the first configuration example shown in FIG. 1, the positive lens group G13 includes two biconvex lenses, and the positive lens group G16 includes one positive lens. In the second configuration example shown in FIG. 2, the positive lens group G13 includes one biconvex lens, and the positive lens group G16 includes one positive lens. In the third configuration example shown in FIG. 3, the positive lens group G13 includes one biconvex lens, and the positive lens group G16 includes two positive lenses.

It is preferable that, in the second subgroup G1B, the negative lens G14 and the positive lens G15 are cemented to each other. Also, it is preferable that the negative lens G14 and the positive lens G15 satisfy the following conditions, $$n14 > 1.8 \quad (7)$$

$$n15 < 1.5 \quad (8)$$

$$v15 > 70 \quad (9)$$

where n14 denotes a refractive index of the negative lens G14 at the d-line, n15 denotes a refractive index of the positive lens G15 at the d-line, and v15 denotes an Abbe number of the positive lens G15 at the d-line.

The third group G3 includes, in order from the object side, a third subgroup G31, a fourth subgroup G32, and a fifth subgroup G33. The fourth subgroup G32 is configured to be movable for image stabilization in the direction perpendicular to the optical axis Z1. With such a configuration, it is possible to achieve a zoom lens having a vibration control function.

It is preferable that the fourth group G4 includes at least one aspherical lens. Also, it is preferable that the fourth group G4 includes a cemented lens.

Hereinafter, operations and advantages of the rear-focusing type zoom lens configured as described above will be described.

In the rear-focusing type zoom lens, the third group G3 has a negative power, and the first group G1 has a retrofocus type structure including the negative first subgroup G1A and the positive second subgroup G1B. Thereby, it is possible to ensure a sufficiently long back focal length while achieving the widening of the angle of view and. Also, by optimizing the lens configurations in the first subgroup G1A and the second subgroup G1B, aberration is sufficiently corrected at the telephoto end where the high zoom ratio can be achieved.

Particularly, the first subgroup G1A is configured to include, in order from the object side, one negative meniscus lens G1 having the convex surface directed toward the object side and one negative lens G12, and its negative power is distributed to these lenses. Thereby, it is possible to suppress the various aberrations at the telephoto end. Also, since the lens surface of the first subgroup G1A on the most object side is formed into the convex surface, it is possible to satisfactorily suppress distortion and astigmatism.

The conditional expressions (1) and (2) define a refractive power appropriate to the first subgroup G1A. If |f11/fw| and |f11/Bfw| exceed the upper limits of the conditional expressions (1) and (2), the refractive power of the first subgroup G1A decreases. Therefore, the field of curvature deteriorates, and the effective diameter of the first subgroup G1A increases. Besides, if |f11/fw| and |f11/Bfw| falls below the lower limits of the conditional expressions (1) and (2), the refractive power of the first subgroup G1A increases, and thus distortion deteriorates.

In order to obtain better performance, it is preferable that, instead of the conditional expressions (1) and (2), the following numerical ranges are satisfied.

$$7 < |f11/fw| < 11 \quad (1A)$$

$$1 < |f11/Bfw| < 2 \quad (2A)$$

The conditional expressions (3) to (6) define appropriate refractive indices and appropriate Abbe numbers of the respective lenses of the first subgroup G1A. Since the glass material having 1.8 or more in refractive index is employed in the lenses of the first subgroup G1A, it is possible to suppress an increase in diameter while suppressing the field of curvature and the distortion. Also, by setting an Abbe number to be greater than 30, it is possible to suppress the lateral chromatic aberration.

In the rear-focusing type zoom lens, the positive lens group G13 of the second subgroup G1B is disposed just after the first subgroup G1A. Thereby, it is possible to suppress an increase in diameter of the first subgroup G1A. Also, the negative lens G14 and the positive lens G15 are disposed thereafter. Thereby, it is possible to satisfactorily correct the chromatic aberration. Also, the positive lens group G16 is disposed in front of the negative second group G2 that moves during zooming. Therefore, it is possible to suppress an increase in diameter of the whole first group G1.

In particular, in the second subgroup G1B, the positive lens group G13 includes the biconvex lens. Thereby, it is possible to suppress the spherical aberration and the field of curvature at the telephoto end. Also, the conditional expressions (7) to (9) define appropriate refractive indices and appropriate Abbe numbers for the negative lens G14 and the positive lens G15 of the second subgroup G1B. When the negative lens G14 and the positive lens G15 are formed into the cemented lens and when the conditional expressions (7) to (9) are satisfied, it is possible to satisfactorily correct the chromatic aberration. Particularly, it is possible to eliminate the secondary spectrum.

Also, in the rear-focusing type zoom lens, an aspherical lens is disposed in the fourth group G4 that moves during zooming and focusing. Thus, it is possible to prevent fluctuation of aberrations, which is caused by zooming. Particularly, it is possible to satisfactorily correct the spherical aberration in the whole zooming range.

As described above, according to the rear-focusing type zoom lens of this embodiment, the third group G3 has the negative power, and the first group G1 has the retrofocus type structure including the negative first subgroup G1A and the positive second subgroup G1B. Thereby, the configuration is advantageous to achieve the widening of the angle of view and to ensure the back focal length. In addition, the lens configurations in the first subgroup G1A and second subgroup G1B are optimized. Therefore, it is possible to well correct the various aberrations while ensuring a sufficiently long back focal length, thereby achieving a good balance between the widening of the angle of view and the high zoom ratio. Also, when the rear-focusing type zoom lens according to this embodiment is mounted on the imaging apparatus, it is possible to obtain an image having a wide angle and high quality.

EXAMPLES

Hereinafter, specific numerical examples of the rear-focusing type zoom lens according to the above embodiment will be described. In the following explanation, the first to third numerical examples will be collectively described.

FIGS. 4 and 5(A) to 5(C) show, as Example 1, specific lens data corresponding to the configuration of the rear-focusing type zoom lens shown in FIG. 1. Particularly, FIG. 4 shows basic lens data thereof. In the column of the surface number Si in the lens data of FIG. 4) the number i represents the sequential number of i-th surface that sequentially increases as it gets closer to the image side when a surface of an element, on the most object side, of the rear-focusing type zoom lens according to Example 1 is regarded as a first surface. The column of the curvature radius Ri shows values (mm) of the curvature radius of i-th surface from the object side, assuming that the reference sign R1 in FIG. 1 represents a curvature radius of the first surface. Likewise, the column of the surface separation Di shows spaces (mm), on the optical axis, between the i-th surface Si and the (i+1)th surface Si+1 from the object side. The column of ndj shows values of the refractive index of the j-th optical element from the object side at the d-line (587.6 nm). The column of vdj shows values of the Abbe number of the j-th optical element from the object side at the d-line.

In the rear-focusing type zoom lens according to Example 1, the lens of the fourth group G4 on the most image side includes an aspherical lens both surfaces of which are aspheric. The basic lens data of FIG. 4 shows numerical values of the curvature radius (paraxial curvature radius) in the vicinity of the optical axis as the radiuses of curvature of these aspheric surfaces are represented.

FIG. 5(A) shows aspheric surface data of Example 1. In the numerical values shown as the aspheric surface data, the reference sign 'E' means that a numerical value following it is a 'power exponent' having a base of 10 and that this numerical value having a base of 10 and expressed by an exponential function is multiplied by a numerical value before the 'E'. For example, '1.0E-02' means '1.0×10$^{-2}$'.

As the aspheric surface data, there are shown the respective coefficients Ai and K used in an aspheric surface shape expression expressed by the following expression (A). Here, Z denotes a length (mm) of a perpendicular dropped from a point, which exists on an aspheric surface at a position of a height h from the optical axis, to a tangent plane to the vertex of the aspheric surface (a plane perpendicular to the optical axis). In the rear-focusing type zoom lens of Example 1, as the aspheric surface coefficients Ai, there are used fourth-order, sixth-order, eighth-order, and tenth-order coefficients A4, A6, A8, and A10 effectively.

$$Z = C \cdot \frac{h^2}{1 + \sqrt{1 - K \cdot C^2 \cdot h^2}} + \sum A_i \cdot h^i \quad (A)$$

where

Z denotes a depth (mm) of an aspheric surface, h denotes a distance (a height, mm) from the optical axis (a height) to the lens surface, K denotes an eccentricity, C denotes a paraxial curvature equal to 1/R (R: a paraxial curvature radius), and Ai denotes an i-th order (i is an integer not less than 3) aspheric surface coefficient.

Also, in the rear-focusing type zoom lens according to Example 1, the second group G2 and the fourth group G4 move on the optical axis during zooming. Thus, values of the surface separations D13, D20, D29, and D34 in the front and rear of these groups G2 and G4 are variable. FIG. 5(B) shows, as data of these surface separations that are variable during zooming, values thereof at the wide-angle end, a medium focal length and the telephoto end. FIG. 5(B) shows, as the other various data, a paraxial focal length f (mm) of the whole system, a F number (FNO.), a half angle of view ω, an image height, a total length of the lens system, and a back focal length Bf at each of the wide-angle end, the medium focal length, and the telephoto end. Furthermore, a zoom ratio of the rear-focusing type zoom lens according to Example 1 is set to 7.8.

Also, FIG. 5(C) shows paraxial focal lengths (mm) of the first group G1 to the fifth group G5.

Similarly to Example 1 mentioned above, FIGS. 6 and 7(A) to 7(C) show, as Example 2, specific lens data corresponding to the configuration of the rear-focusing type zoom lens shown in FIG. 2. In the rear-focusing type zoom lens according to Example 2, similarly to Example 1, the lens of the fourth group G4 on the most image side is formed as an aspherical lens both surfaces of which is aspheric. FIG. 7(A) shows aspherical surface data thereof. Also, similarly to Example 1, the second group G2 and the fourth group G4 move on the optical axis during zooming, and thus values of surface separations D11, D18, D27, and D32 in the front and rear of these groups G2 and G4 are variable. FIG. 7(B) shows, as data of these surface separations that are variable during zooming, values thereof at the wide-angle end, a medium focal length and the telephoto end. Also, a zoom ratio of the rear-focusing type zoom lens according to Example 2 is set to 7.8.

Similarly, FIGS. 8 and 9(A) to 9(C) show, as Example 3, specific lens data corresponding to the configuration of the rear-focusing type zoom lens shown in FIG. 3. In the rear-focusing type zoom lens according to Example 3, similarly to Example 1, the lens of the fourth group G4 on the most image side includes an aspherical lens both surfaces of which are aspheric. FIG. 9(A) shows aspherical surface data thereof. Also, similarly to Example 1, the second group G2 and the fourth group G4 move on the optical axis during zooming, and thus values of surface separations D13, D20, D29, and D34 in the front and rear of these groups G2 and G4 are variable. FIG. 9(B) shows, as data of these surface separations that are variable during zooming, values thereof at the wide-angle end, a medium focal length and the telephoto end. Also, a zoom ratio of the rear-focusing type zoom lens according to Example 3 is set to 7.8.

FIG. 10 collectively shows values of the conditional expressions mentioned above for respective Examples. As shown in FIG. 10, values of Examples fall within the allowable ranges of the conditional expressions.

FIGS. 11(A) to 11(D) show spherical aberration, astigmatism, distortion (distortion aberration), and lateral chromatic aberration in the rear-focusing type zoom lens according to Example 1, respectively, in a state where the lens at the wide-angle end focuses on an object at infinity. The aberration diagrams show aberrations with using the d-line (a wavelength of 587.6 nm) as a reference wavelength. The spherical aberration diagram shows aberrations at the g-line (a wavelength of 435.8 nm) and the C-line (a wavelength of 656.3 nm). In the astigmatism diagram, the solid line represents aberration in the sagittal direction, and the dashed line represents aberrations in the tangential direction. The FNO. represents a F number, and the ω represents a half angle of view. Similarly, FIGS. 12(A) to 12(D) show spherical aberration, astigmatism, distortion, and lateral chromatic aberration, respectively, in a state where the lens at the telephoto end focuses on an object at infinity.

Similarly, FIGS. 13(A) to 13(D) show various aberrations of the rear-focusing type zoom lens according to Example 2 in a state where the lens at the wide-angle end focuses on an object at infinity. Similarly, FIGS. 14(A) to 14(D) show spherical aberration, astigmatism, distortion, and lateral chromatic aberration, respectively, in a state where the lens at the telephoto end focuses on an object at infinity.

Also, similarly, FIGS. 15(A) to 15(D) show various aberrations of the rear-focusing type zoom lens according to Example 3 in a state where the lens at the wide-angle end focuses on an object at infinity. Similarly, FIGS. 16(A) to 16(D) show spherical aberration, astigmatism, distortion, and lateral chromatic aberration, respectively, in a state where the lens at the telephoto end focuses on an object at infinity.

As can be seen from the numerical data and the aberration diagrams, in each Examples, there has been provided the rear-focusing type zoom lens that can well correct the various aberrations while ensuring a sufficiently long back focal length and achieve a good balance between the widening of the angle of view and the high zoom ratio.

Also, the invention is not limited to the embodiments and the examples, and may be modified in various ways. For example, the values of the curvature radius, the surface separation, and the refractive index in the lens elements are not limited to the values shown in the numerical examples, and may have different values.

What is claimed is:

1. A rear-focusing type zoom lens comprising, in order from an object side:
    a positive first group that is fixed;
    a negative second group that moves toward an image plane along an optical axis during zooming from a wide-angle end to a telephoto end;
    a negative third group that is fixed in an optical axis direction; and
    a positive fourth group that moves along the optical axis direction to correct image plane variation, which is caused by the zooming, and to perform focusing, wherein
    the first group includes, in order from the object side, a first subgroup having a negative power as a whole and a second subgroup having a positive power as a whole,
    the first subgroup includes, in order from the object side, a negative meniscus lens having a convex surface directed to the object side and a negative lens, and
    the second subgroup includes, in order from the object side,
        a first positive lens group including at least one positive lens,
        a negative lens,
        a positive lens, and
        a second positive lens group including at least one positive lens.

2. The rear-focusing type zoom lens according to claim 1, wherein the following conditional expressions are satisfied:

$$7 < |f11/fw| < 12 \quad (1)$$

$$0.6 < |f11/Bfw| < 2 \quad (2)$$

where
   f11 denotes a focal length of the first subgroup,
   fw denotes a focal length of the whole system at the wide-angle end, and
   Bfw denotes a back focal length at the wide-angle end, the back focal length being defined as an air-equivalent value of an optical axis distance from the last lens surface to the image plane.

3. The rear-focusing type zoom lens according to claim 1, wherein the following conditional expressions are further satisfied:

$$n11 > 1.8 \quad (3)$$

$$v11 > 30 \quad (4)$$

where
   n11 denotes a refractive index of the negative meniscus lens of the first subgroup at the d-line, and
   v11 denotes an Abbe number of the negative meniscus lens of the first subgroup at the d-line.

4. The rear-focusing type zoom lens according to claim 1, wherein the following conditional expressions are further satisfied:

$$n12 > 1.8 \quad (5)$$

$$v12 > 30 \quad (6)$$

where
   n12 denotes a refractive index of the negative lens of the first subgroup at the d-line, and
   v12 denotes an Abbe number of the negative lens of the first subgroup at the d-line.

5. The rear-focusing type zoom lens according to claim 1, wherein the first positive lens group of the second subgroup includes at least one biconvex lens.

6. The rear-focusing type zoom lens according to claim 1, wherein the following conditional expression is further satisfied:

$$n14 > 1.8 \quad (7)$$

where n14 denotes a refractive index of the negative lens of the second subgroup at the d-line.

7. The rear-focusing type zoom lens according to claim 1, wherein the following conditional expressions are further satisfied:

$$n15 < 1.5 \quad (8)$$

$$v15 > 70 \quad (9)$$

where
   n15 denotes a refractive index of the positive lens of the second subgroup at the d-line, and
   v15 denotes an Abbe number of the positive lens of the second subgroup at the d-line.

8. The rear-focusing type zoom lens according to claim 1, wherein the negative lens of the second subgroup and the positive lens of the second subgroup are cemented to each other.

9. The rear-focusing type zoom lens according to claim 1, wherein the fourth group includes at least one aspherical lens.

10. The rear-focusing type zoom lens according to claim 1, further comprising
    a positive or negative fifth group that is disposed on an image plane side of the fourth group.

11. The rear-focusing type zoom lens according to any one of claim 1, wherein
    the third group includes, in order from the object side, a third subgroup, a fourth subgroup and a fifth subgroup,
    the fourth subgroup is movable in a direction perpendicular to the optical axis, for image stabilization.

12. An imaging apparatus comprising:
    the rear-focusing type zoom lens according to claim 1; and
    an imaging device that outputs an imaging signal based on an optical image formed by the rear-focusing type zoom lens.

13. The rear-focusing type zoom lens according to claim 2, wherein the following conditional expressions are further satisfied:

$$n11 > 1.8 \quad (3)$$

$$v11 > 30 \quad (4)$$

where
- n11 denotes a refractive index of the negative meniscus lens of the first subgroup at the d-line, and
- ν11 denotes an Abbe number of the negative meniscus lens of the first subgroup at the d-line.

14. The rear-focusing type zoom lens according to claim 2, wherein the following conditional expressions are further satisfied:

$$n12 > 1.8 \quad (5)$$

$$\nu12 > 30 \quad (6)$$

where
- n12 denotes a refractive index of the negative lens of the first subgroup at the d-line, and
- ν12 denotes an Abbe number of the negative lens of the first subgroup at the d-line.

15. The rear-focusing type zoom lens according to claim 2, wherein the first positive lens group of the second subgroup includes at least one biconvex lens.

16. The rear-focusing type zoom lens according to claim 2, wherein the following conditional expression is further satisfied:

$$n14 > 1.8 \quad (7)$$

where n14 denotes a refractive index of the negative lens of the second subgroup at the d-line.

17. The rear-focusing type zoom lens according to claim 2, wherein the following conditional expressions are further satisfied:

$$n15 < 1.5 \quad (8)$$

$$\nu15 > 70 \quad (9)$$

where
- n15 denotes a refractive index of the positive lens of the second subgroup at the d-line, and
- ν15 denotes an Abbe number of the positive lens of the second subgroup at the d-line.

18. The rear-focusing type zoom lens according to claim 2, further comprising
- a positive or negative fifth group that is disposed on an image plane side of the fourth group.

19. The rear-focusing type zoom lens according to any one of claim 2, wherein
- the third group includes, in order from the object side, a third subgroup, a fourth subgroup and a fifth subgroup,
- the fourth subgroup is movable in a direction perpendicular to the optical axis, for image stabilization.

20. An imaging apparatus comprising:
the rear-focusing type zoom lens according to claim 2; and
an imaging device that outputs an imaging signal based on an optical image formed by the rear-focusing type zoom lens.

* * * * *